United States Patent
Lee (10) Patent No.: US 10,787,964 B2
(45) Date of Patent: Sep. 29, 2020

(54) ENERGY STORAGE AND RELEASE APPARATUS AND METHOD FOR ENERGY STORAGE AND RELEASE

(71) Applicant: Chung-Yu Lee, Kaohsiung (TW)

(72) Inventor: Chung-Yu Lee, Kaohsiung (TW)

(*) Notice: Subject to any disclaimer, the term of this patent is extended or adjusted under 35 U.S.C. 154(b) by 69 days.

(21) Appl. No.: 16/176,038

(22) Filed: Oct. 31, 2018

(65) Prior Publication Data

US 2019/0128185 A1 May 2, 2019

Related U.S. Application Data

(60) Provisional application No. 62/580,909, filed on Nov. 2, 2017.

(51) Int. Cl.
*F02C 6/16* (2006.01)
*F02C 1/04* (2006.01)

(52) U.S. Cl.
CPC .................. *F02C 6/16* (2013.01); *F02C 1/04* (2013.01); *F05D 2260/213* (2013.01); *F05D 2260/42* (2013.01)

(58) Field of Classification Search
CPC .......... F02C 1/04; F02C 6/16; F05D 2260/42; F05D 2260/213
See application file for complete search history.

(56) References Cited

U.S. PATENT DOCUMENTS

| | | | | |
|---|---|---|---|---|
| 5,634,340 A | * | 6/1997 | Grennan | F02C 1/02 60/648 |
| 5,778,675 A | * | 7/1998 | Nakhamkin | F02C 6/16 60/39.17 |
| 6,446,385 B1 | * | 9/2002 | Crutcher | A01G 9/18 47/17 |
| 7,444,818 B1 | * | 11/2008 | Brostmeyer | F01K 3/12 60/682 |
| 9,754,856 B2 | * | 9/2017 | Caroff | H01L 23/38 |
| 2012/0102937 A1 | * | 5/2012 | Anikhindi | F02C 6/16 60/413 |

(Continued)

FOREIGN PATENT DOCUMENTS

| | | |
|---|---|---|
| CN | 106415232 | 2/2017 |
| CN | 107110024 A | 8/2017 |

(Continued)

*Primary Examiner* — Shafiq Mian
(74) *Attorney, Agent, or Firm* — Li & Cai Intellectual Property (USA) Office (57) ABSTRACT

An energy storage and release apparatus and a method for energy storage and release are disclosed. The energy storage and release apparatus includes a first compression unit, a first heat exchange unit, a gas storage unit, and a turbine unit. The first heat exchange unit is directly or indirectly connected between the gas storage unit and the first compression unit. A first gas enters the first compression unit via a first inlet; sequentially passes through the first compression unit, the first heat exchange unit, the gas storage unit, and the turbine unit; and then is discharged. A first temperature of the first gas before entering the first heat exchange unit is higher than a second temperature of the first gas after passing through the first heat exchange unit, and a first heat energy is provided by a temperature difference between the first temperature and the second temperature.

18 Claims, 3 Drawing Sheets

(56) References Cited

U.S. PATENT DOCUMENTS

| | | | |
|---|---|---|---|
| 2013/0061591 A1* | 3/2013 | Bove | F02C 6/16 |
| | | | 60/645 |
| 2016/0216044 A1* | 7/2016 | Narine | F02C 1/04 |
| 2017/0211550 A1* | 7/2017 | Jiang | F03G 6/04 |
| 2017/0324291 A1* | 11/2017 | Tamura | H02K 15/0421 |
| 2018/0266315 A1 | 9/2018 | Kubo | |

FOREIGN PATENT DOCUMENTS

| | | |
|---|---|---|
| EP | 2447501 A2 | 5/2012 |
| EP | 3199780 A1 | 8/2017 |
| WO | WO 2016104222 A1 | 6/2016 |
| WO | WO 2016120750 A1 | 8/2016 |
| WO | WO 2017194253 A1 | 11/2017 |

* cited by examiner

Provide electric energy from a temperature difference between the first heat exchange unit and the second heat exchange unit by using a thermoelectric element connected between the first heat exchange unit and the second heat exchange unit —S200

ENERGY STORAGE AND RELEASE APPARATUS AND METHOD FOR ENERGY STORAGE AND RELEASE

CROSS-REFERENCE TO RELATED PATENT APPLICATION

This application claims priority from the U.S. Provisional Patent Application Ser. No. 62/580,909 filed Nov. 2, 2017, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an energy storage and release apparatus and a method for energy storage and release, and in particular, to an energy storage and release apparatus and a method for energy storage and release that both use air compression.

BACKGROUND OF THE DISCLOSURE

An operation mode of a Compressed Air Energy System (CAES) in the related art is as follows: when the load of a power grid is low, a compressor in the CAES is used to compress the air, and seal the air at a high pressure in geologic space such as a mine, an oil and gas well, the deep ocean, or a cave. The compressed air is released in a peak power consumption period to drive a turbine generator.

The CAES has advantages such as higher energy storage capacity, long storage cycle, high efficiency, and low cost. However, still depending on combustion for heat energy, the conventional CAES is limited by the cost of fuel and pollution from combustion products. In addition, suitable gas storage spaces may be limited by the geographical conditions. Therefore, the current CAES still has room for improvement.

SUMMARY OF THE INVENTION

In response to the above-referenced technical inadequacies, the present disclosure provides an energy storage and release apparatus. The apparatus uses a heat exchange unit to cool gas which heats up after compression, and it can switch between energy storage and release while unceasingly receiving, compressing and cooling the gas. Moreover, the apparatus can also adjust the temperature of gas discharged from an outlet by using the heat of gas entering from an inlet. Thus, heat energy required for gas expansion can be provided without the use of a combustor or heat storage and release apparatus.

In one aspect, the present disclosure provides an energy storage and release apparatus, which includes a first compression unit, a first heat exchange unit, a gas storage unit, and a turbine unit. The first compression unit is connected to a first inlet, the first heat exchange unit is directly or indirectly connected between the first compression unit and the gas storage unit, and the turbine unit is connected between the first heat exchange unit and an outlet. A first gas enters the first compression unit via the first inlet; sequentially passes through the first compression unit, the first heat exchange unit, the gas storage unit, and the turbine unit; and then is discharged from the outlet. A first temperature of the first gas before entering the first heat exchange unit is higher than a second temperature of the first gas after passing through the first heat exchange unit, and a first heat energy is provided by a temperature difference between the first temperature and the second temperature of the first gas.

In one aspect, the present disclosure provides a method for energy storage and release, which includes: passing a first gas through a first compression unit to compress the first gas; passing the first gas through a first heat exchange unit, where a first temperature of the first gas before entering the first heat exchange unit is higher than a second temperature of the first gas after passing through the first heat exchange unit, and a first heat energy is provided by a temperature difference between the first temperature and the second temperature of the first gas; storing the first gas in a gas storage unit; and releasing the first gas from the gas storage unit, such that the first gas passes through a turbine unit and then is discharged from an outlet, where the first gas drives the turbine unit while passing through the turbine unit.

One beneficial effect of the present disclosure is as follows: the energy storage and release apparatus and the method for energy storage and release provided by the present disclosure use the technical solutions of directly or indirectly connecting a first heat exchange unit between a first compression unit and a gas storage unit; passing the first gas sequentially through the first compression unit, the first heat exchange unit, the gas storage unit, and a turbine unit; and then discharging the first gas from an outlet. As such, a first temperature of the first gas before entering the first heat exchange unit is higher than a second temperature of the first gas after passing through the first heat exchange unit, and thereby a first heat energy is provided by a temperature difference between the first temperature and the second temperature of the first gas, to adjust the temperature of the first gas after it passes through the turbine unit. Moreover, switching between energy storage and release can be performed while the first gas is unceasingly processed.

In order to further understand features and technical content of the present disclosure, reference is made to the following detailed descriptions and drawings related to the present disclosure. However, the accompanying drawings are merely used for provision of reference and explanation, but not intended to limit the present disclosure.

DETAILED DESCRIPTION OF THE PREFERRED EMBODIMENTS

The following describes an implementation manner of the present disclosure relating to "an energy storage and release apparatus and a method for energy storage and release" through specific embodiments. Those skilled in the art can understand the advantages and effects of the present disclosure from the content disclosed in the specification. The present disclosure can be embodied or applied through other different embodiments. Based on different opinions and applications, the details of the present specification can also be modified and changed without departing from the concept of the present disclosure. In addition, the accompanying drawings of the present disclosure are merely for brief illustration and not drawn according to actual dimensions. The following embodiments will further explain the related technical content of the present disclosure, but the disclosure is not intended to limit the technical scope of the present disclosure.

It should be understood that, although the terms "first", "second", "third", and the like are probably used herein to describe elements or signals, these elements or signals should not be limited by these terms. The use of these terms only aims to distinguish one element from another or one signal from another. In addition, the term "or" as used herein shall, according to the actual situation, include any one or a combination of more of the associated listed items.

Figure 1:
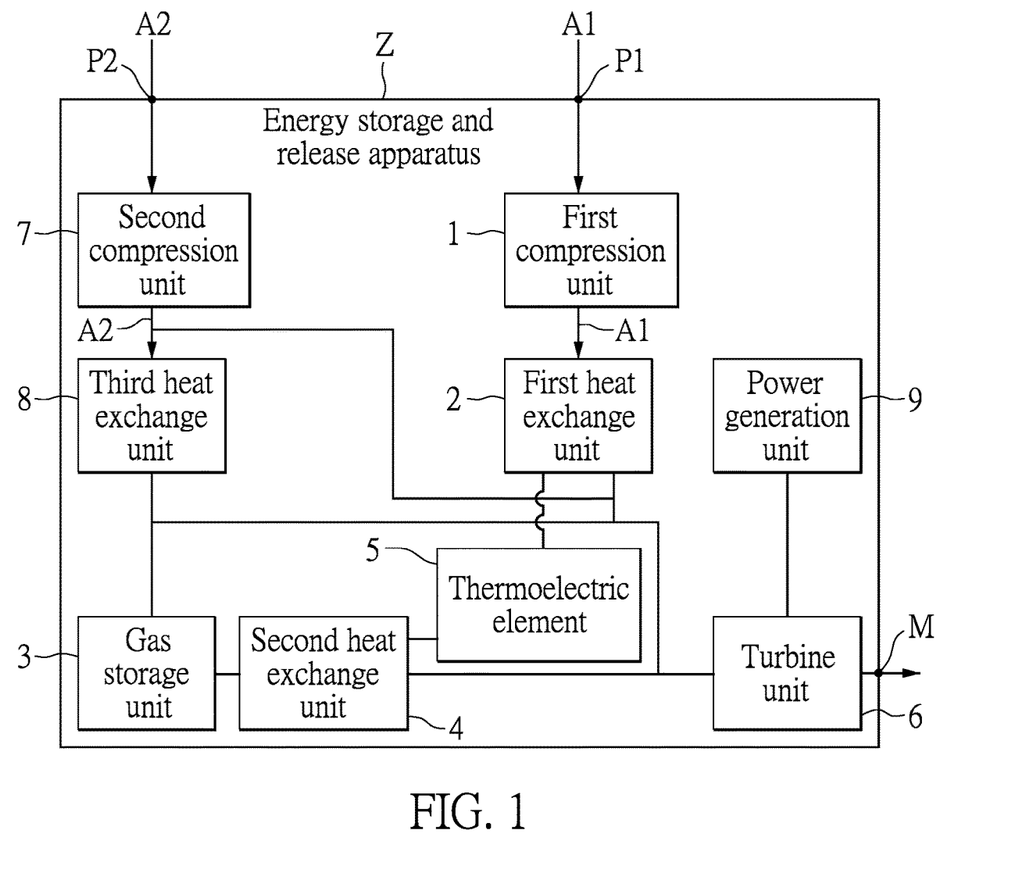
FIG. 1 is a schematic diagram of an energy storage and release apparatus according to an embodiment of the present disclosure.

Reference is made to FIG. 1, which is a schematic diagram of an energy storage and release apparatus according to an embodiment of the present disclosure. The energy storage and release apparatus Z provided by the embodiment of the present disclosure includes a first compression unit 1, a first heat exchange unit 2, a gas storage unit 3, and a turbine unit 6. The first heat exchange unit 2 is connected between the first compression unit 1, the gas storage unit 3, and the turbine unit 6. The turbine unit 6 is connected between the first heat exchange unit 2 and an outlet M. As shown in FIG. 1, a first gas A1 enters the first compression unit 1 via a first inlet P1; sequentially passes through the first compression unit 1, the first heat exchange unit 2, the gas storage unit 3, and the turbine unit 6; and then is discharged from the outlet M. Further, the turbine unit 6 may be a turbine or another mechanical apparatus. The turbine unit 6 receives energy from the first gas A1 that passes through the turbine unit 6, and is further connected to another power unit or a power generation device in a driving manner. For example, the turbine unit 6 of the present disclosure is connected to a power generation unit 9. The power generation unit 9 may be a power generator, and an appropriate type thereof may be selected as required.

Specifically, in this embodiment, the first gas A1 is carbon-dioxide-rich exhaust gas at high temperature from combustion emissions of factories or incinerators. However, the present disclosure is not limited thereto. The first compression unit 1 may be a compressor or another compression apparatus, and is used for compressing the first gas A1. The first heat exchange unit 2 is a heat exchanger, but the present disclosure does not limit the type of the heat exchanger. When the first gas A1 is delivered from the first compression unit 1 to the gas storage unit 3 or flows to the turbine unit 6, the first heat exchange unit 2 cools the first gas A1 and provides a first heat energy.

Further, the energy storage and release apparatus Z in the embodiment of the present disclosure further includes a second heat exchange unit 4 connected between the first heat exchange unit 2 and the gas storage unit 3.

It should be noted that, in other embodiments, the energy storage and release apparatus Z of the present disclosure may also not include the second heat exchange unit 4. In this embodiment, the second heat exchange unit 4 is used for further cooling the first gas A1, and supplying heat to the first gas A1 during expansion of the first gas A1. The first gas A1, which expands through heat absorption by the second heat exchange unit 4, passes through the turbine unit 6 to drive the turbine unit 6, such that the turbine unit 6 drives the power generation unit 9.

In the case where the energy storage and release apparatus Z includes the second heat exchange unit 4, as described in this embodiment, after entering the first compression unit 1 via the first inlet P1, the first gas A1 is sequentially processed by the first compression unit 1, the first heat exchange unit 2, the second heat exchange unit 4, the gas storage unit 3, and the second heat exchange unit 4; and then passes through the turbine unit 6, and is discharged from the outlet M.

In this embodiment, a thermoelectric element 5 may be disposed between the first heat exchange unit 2 and the second heat exchange unit 4, so as to generate electric energy from a temperature difference between the first heat exchange unit 2 and the second heat exchange unit 4. The thermoelectric element 5 may be any thermoelectric converter or device, and is used for converting the heat energy (namely, the temperature difference between the first heat exchange unit 2 and the second heat exchange unit 4) into electric energy to improve the utilization of waste heat.

By the foregoing structure, the energy storage and release apparatus Z of the present disclosure can use the waste heat to perform gas compression and energy storage. When electricity consumption from the power grid is low, the first gas A1 (for example, the exhaust gas from factories) is compressed by the first compression unit 1, cooled by the first heat exchange unit 2 and the second heat exchange unit 4, and is then stored in the gas storage unit 3. When the load of the power grid is high, the compressed first gas A1 is released from the gas storage unit 3, and the first gas A1 flowing out of the gas storage unit 3 and passing through the second heat exchange unit 4 absorbs the first heat energy and expands. The first heat energy is sent out when the first heat exchange unit 2 cools the first gas A1. In addition, while the first gas A1 is unceasingly input within a period of time via the first inlet P1 and passes through the first heat exchange unit 2, this newly input first gas A1 and the first gas A1 that is released from the gas storage unit 3 and delivered from the second heat exchange unit 4 to the turbine unit 6 can converge between the second heat exchange unit 4 and the turbine unit 6. Afterwards, the converged first gas A1 passes through the turbine unit 6. The turbine unit 6 receives energy from the first gas A1 to drive the power generation unit 9. By use of the foregoing method, the present disclosure can unceasingly process the first gas A1 input via the first inlet P1, while storing/releasing the electricity of the power grid.

In this embodiment, the outlet M of the energy storage and release apparatus Z is connected to a plant cultivation device (not shown in the figure), such that the first gas A1 enters the plant cultivation device via the outlet M. The plant cultivation device may be a farmland or a greenhouse, and the present disclosure does not limit the particular configuration thereof. By use of the foregoing structure, carbon-dioxide-rich gas (for example, carbon-dioxide-rich exhaust gas at high temperature) can be used in the present disclosure. After compression, cooling, and storage, the carbon-dioxide-rich first gas A1 can be supplied to the plants in the plant cultivation device for photosynthesis, fully recycling the exhaust gas. It should be noted that, the foregoing merely gives an example of one configuration of the present disclosure, and in other embodiments, the outlet M may also be connected to other apparatuses requiring high-concentration carbon dioxide.

Furthermore, the energy storage and release apparatus Z in this embodiment also includes a gas mixing unit (not shown in the figure), which may be disposed at the first inlet P1 or the outlet M, or at the first inlet P1 and the outlet M separately, so as to adjust the composition or temperature of the first gas A1. For example, when the concentration of carbon dioxide in exhaust gas discharged by a factory is excessively high for the plants, the gas mixing unit may be used to mix air into the first gas A1, to reduce the concentration of the carbon dioxide.

Referring to FIG. 1, the energy storage and release apparatus Z in the embodiment of the present disclosure further includes a second compression unit 7 and a third heat exchange unit 8. The third heat exchange unit 8 is connected between the second compression unit 7 and the gas storage unit 3. A second gas A2 enters the second compression unit 7 via a second inlet P2; is sequentially processed by the second compression unit 7 and the third heat exchange unit 8; and then enters the gas storage unit 3, so as to store energy, or replace the first gas A1 stored in the gas storage unit 3, or simultaneously store/release energy and replace the first gas A1 stored in the gas storage unit 3. In this embodiment, the second gas A2 is air, but the present disclosure is not limited thereto.

In the embodiment of the present disclosure, in the case where the energy storage and release apparatus Z further includes the third heat exchange unit 8, the position of the thermoelectric element 5 may be adjusted according to application requirements. Specifically, the thermoelectric element 5 may be disposed between the second heat exchange unit 4 and the third heat exchange unit 8, so as to use the temperature difference between the second heat exchange unit 4 and the third heat exchange unit 8 to provide electric energy. Alternatively, the thermoelectric element 5 may also be disposed on at least one of the first heat exchange unit 2, the second heat exchange unit 4, and the third heat exchange unit 8. For example, the thermoelectric element 5 may be attached to the first heat exchange unit 2, the second heat exchange unit 4, or the third heat exchange unit 8.

Specifically, the time at which the electricity consumption from the power grid is high may not coincide with the time at which the plants need carbon dioxide. For example, the carbon dioxide in the first gas A1 stored in the gas storage unit 3 is needed from morning to noon, but the energy stored in the first gas A1 is not yet needed. In this case, the second compression unit 7 and the third heat exchange unit 8 may be used to deliver the second gas A2 into the gas storage unit 3, to discharge the carbon-dioxide-rich first gas A1.

Referring to FIG. 1, in the energy storage and release apparatus Z of the present disclosure, the first heat exchange unit 2 may be connected to the third heat exchange unit 8, such that the first gas A1 sequentially passes through the first compression unit 1, the first heat exchange unit 2, and the third heat exchange unit 8, and then enters the gas storage unit 3, to store energy, or replace the second gas A2 stored in the gas storage unit 3, or simultaneously store/release energy and replace the second gas A2 stored in the gas storage unit 3.

To be specific, it takes time for the plants to absorb the carbon dioxide for photosynthesis. Therefore, if the remaining daylight in the afternoon is insufficient for the plants to fully absorb the carbon dioxide released from the energy storage and release apparatus Z in this embodiment (for example, an hour or so before sunset), the energy storage and release apparatus Z of the present disclosure may stop discharging the carbon-dioxide-rich first gas A1 to the plant cultivation device. Instead, the first gas A1 is processed by the first compression unit 1, the first heat exchange unit 2, and the third heat exchange unit 8, and then enters the gas storage unit 3, so as to discharge the second gas A2 to make the power generation unit 9 continuously generate electricity.

In other embodiments, the first gas A1 may also pass through the first compression unit 1 and the first heat exchange unit 2 sequentially, and then enter the gas storage unit 3 to replace the second gas A2 in the gas storage unit 3. The replaced second gas A2 passes through the turbine unit 6 and is then discharged from the outlet M.

Referring to FIG. 2 to FIG. 5, a method for energy storage and release provided by an embodiment of the present disclosure uses the energy storage and release apparatus Z, where the method includes at least the following steps: step S100: passing a first gas A1 through a first compression unit 1 to compress the first gas A1; step S102: passing the first gas through a first heat exchange unit 2, where a first temperature of the first gas A1 before entering the first heat exchange unit 2 is higher than a second temperature of the first gas A1 after passing through the first heat exchange unit 2, and a first heat energy is provided by a temperature difference between the first temperature and the second temperature of the first gas A1; step S103: passing the first gas A1 through a second heat exchange unit 4, where the second temperature of the first gas A1 after flowing out of the first heat exchange unit 2 and before entering the second heat exchange unit 4 is higher than a third temperature of the first gas A1 after passing through the second heat exchange unit 4, and a second heat energy is provided by a temperature difference between the second temperature and the third temperature of the first gas A1; step S104: storing the first gas A1 in a gas storage unit 3; step S105: releasing the first gas A1 from the gas storage unit 3; step S106: passing the first gas A1 released from the gas storage unit 3 through the second heat exchange unit 4, where a fourth temperature of the first gas A1 after flowing out of the gas storage unit 3 and before entering the second heat exchange unit 4 is lower than a fifth temperature of the first gas A1 after passing through the second heat exchange unit 4, there is a temperature difference between the fourth temperature and the fifth temperature, and at least some of the first heat energy is supplied to the first gas A1 for expansion; and step S107: letting the first gas A1 delivered from the second heat exchange unit 4 to a turbine unit 6 and the first gas A1 released from the first heat exchange unit 2 converge between the first heat exchange unit 2 and the turbine unit 6.

Figure 2:
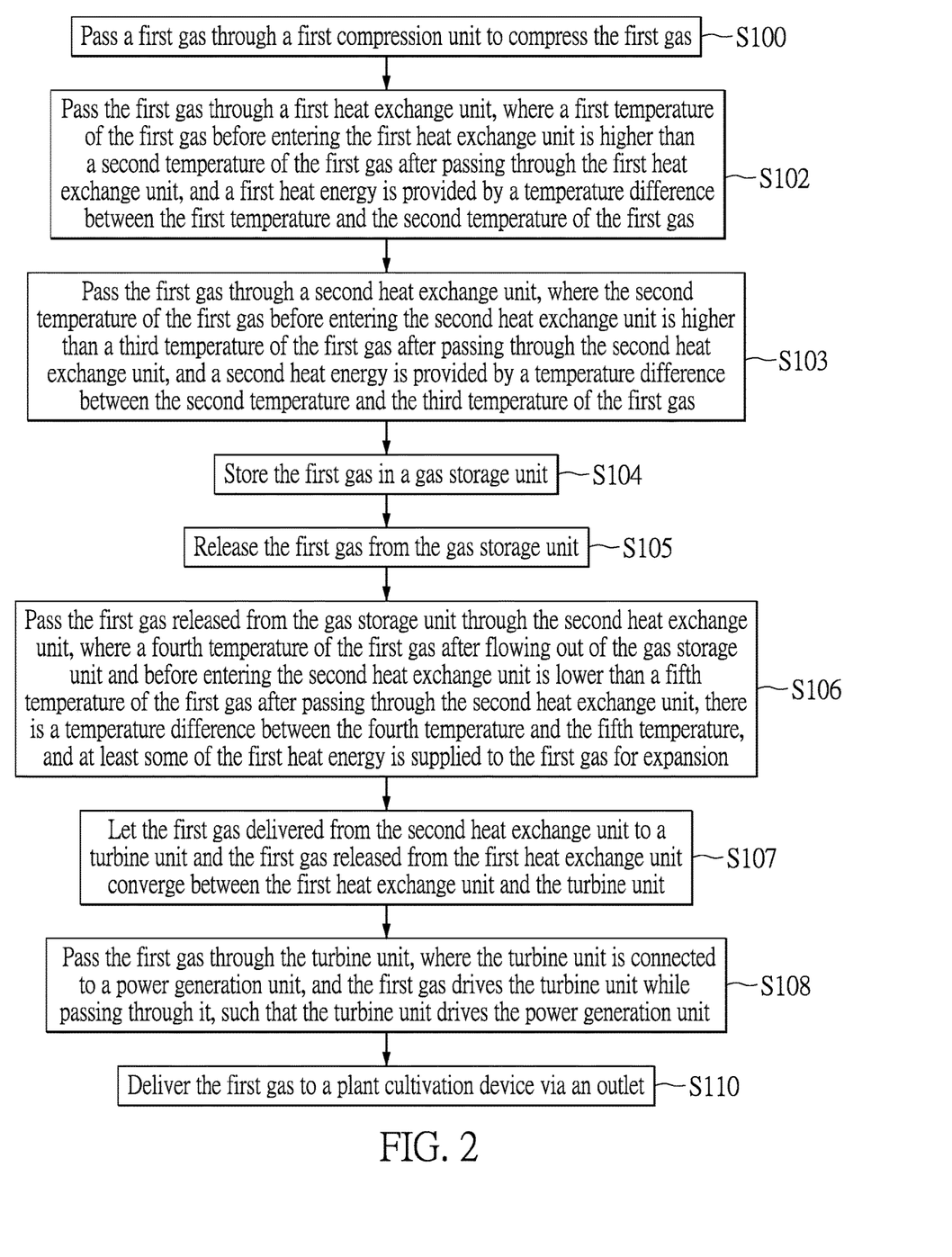
FIG. 2 is a flowchart of compressing and releasing a first gas in a method for energy storage and release according to an embodiment of the present disclosure.

It should be noted that, in other embodiments, the second heat exchange unit 4 may be omitted from the energy storage and release apparatus Z. In such a case, the foregoing steps 103 and 106 may be omitted.

Further, the method for energy storage and release in the embodiment of the present disclosure also includes the following steps: step S108: passing the first gas A1 through the turbine unit 6, where the turbine unit 6 is connected to a power generation unit 9, and the first gas A1 drives the turbine unit 6 while passing through it, such that the turbine unit 6 drives the power generation unit 9; and step S110: delivering the first gas A1 to a plant cultivation device via an outlet M, where the plant cultivation device is connected to the outlet M.

Figure 3:
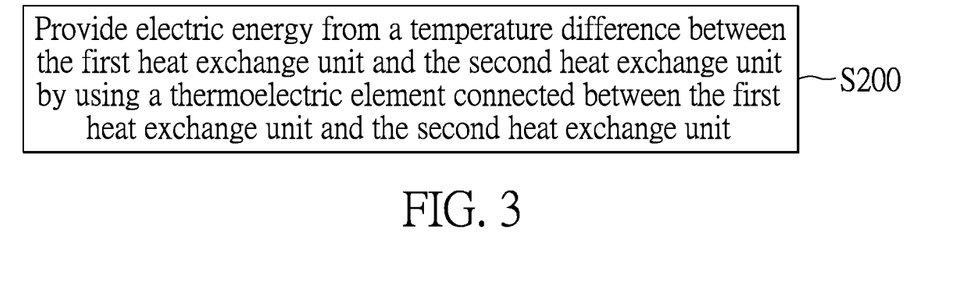
FIG. 3 is a schematic diagram of a step of providing electric energy by using a temperature difference between a first heat exchange unit and a second heat exchange unit in the method for energy storage and release according to an embodiment of the present disclosure.

The method for energy storage and release of the present disclosure may further include step S200: providing electric energy from a temperature difference between the first heat exchange unit 2 and the second heat exchange unit 4 by using a thermoelectric element 5 connected between the first heat exchange unit 2 and the second heat exchange unit 4. Step S200 and any of the foregoing steps, for example, step S106, may be performed at the same time.

Figure 4:
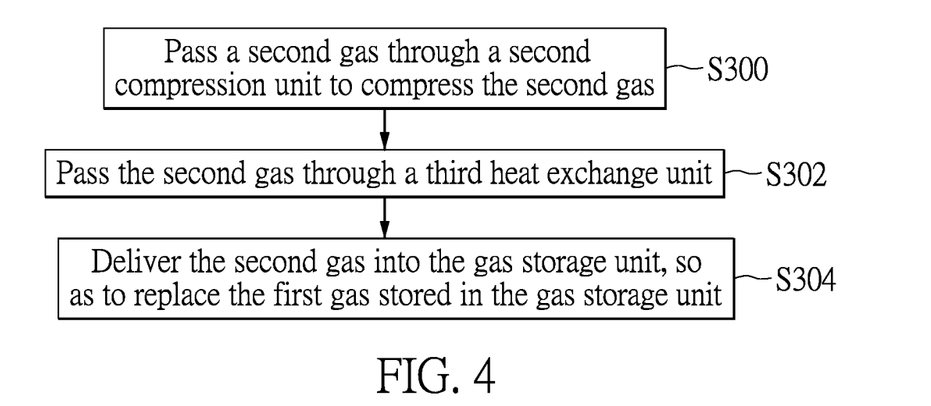
FIG. 4 is a flowchart of replacing a first gas with a second gas in the method for energy storage and release according to an embodiment of the present disclosure.

Furthermore, as described above, when the carbon dioxide in the first gas A1 is needed from morning to noon, but the energy stored in the first gas A1 is not yet needed, the method for energy storage and release of the present disclosure may further include the following steps: step S300: passing a second gas A2 through a second compression unit 7 to compress the second gas A2; step S302: passing the second gas A2 through a third heat exchange unit 8; and step S304: delivering the second gas A2 into the gas storage unit 3, so as to replace the first gas A1 stored in the gas storage unit 3.

Figure 5:
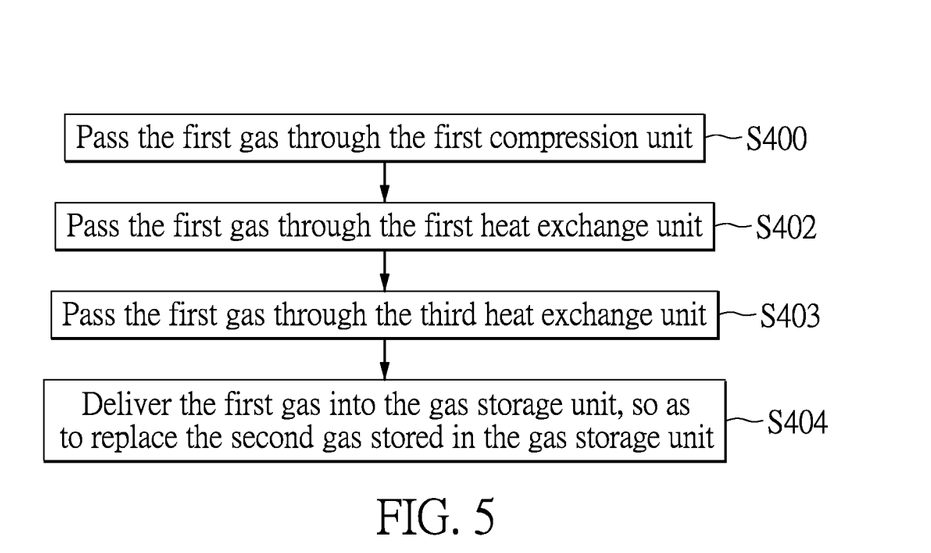
FIG. 5 is a flowchart of replacing a second gas with a first gas in the method for energy storage and release according to an embodiment of the present disclosure.

Furthermore, as described above, when the carbon dioxide in the first gas A1 is not needed because the remaining daylight is insufficient, the method for energy storage and release of the present disclosure may further include the following steps: step S400: passing the first gas A1 through the first compression unit 1 to compress the first gas A1; step S402: passing the first gas A1 through the first heat exchange unit 2; step S403: passing the first gas A1 through the third heat exchange unit 8; and step S404: delivering the first gas A1 into the gas storage unit 3, so as to replace the second gas A2 stored in the gas storage unit 3. Through the foregoing steps, the second gas A2 delivered into the gas storage unit 3 in step S304 can be replaced, such that the power generation unit 9 continuously generates electricity.

It should be noted that, when the first gas A1 has a low temperature and does not need to be cooled twice, after step S402, the first gas A1 may not pass through the third heat exchange unit 8 for temperature reduction (that is, step S403 may be omitted), but is delivered into the gas storage unit 3, to replace the second gas A2 stored in the gas storage unit 3.

With the energy storage and release apparatus Z and the method for energy storage and release in the embodiments, the present disclosure can use carbon-dioxide-rich exhaust gas at high temperature to conduct air compression and energy storage. After compression, the carbon-dioxide-rich first gas A1 is cooled in the first heat exchange unit 2. The heat energy sent out during cooling can be supplied to the first gas A1 or the second gas A2 released from the gas storage unit 3 for the purpose of expansion, thus substituting for a method in the related art that uses a combustor to supply energy for gas expansion. Moreover, some heat energy is converted into electric energy by using a thermoelectric element. In addition, an outlet M is connected to a plant cultivation device to supply the carbon dioxide in the first gas A1 to plants for photosynthesis. Therefore, the energy storage and release apparatus and the method for energy storage and release in the embodiments of the present disclosure can fully recycle the exhaust gas, and use waste heat to improve the efficiency of an energy storage system.

After the fuel is burned, the exhaust gas produced is generally directly discharged into the atmosphere. Plants then capture carbon dioxide from the air. The plants are classified into C3-type, C4-type, and CAM-type according to the way plants perform photosynthesis, in which C3-type is the most common. Specifically, the photosynthetic efficiency of C3-type plants depends on the concentration of the carbon dioxide. Therefore, it is preferred to leave the carbon-dioxide-rich gas in a range near the ground, such that the C3-type plants can absorb the gas to improve the yield efficiency of the plants. Common C3-type plants include staple food crops such as wheat and rice, and most trees. The reaction of the plants to the rising concentration of the carbon dioxide varies among different types of plants, but the yield of the crops such as wheat and rice generally increases (proportion to the concentration of the carbon dioxide). As such, the energy storage and release apparatus and the method for energy storage and release in the embodiments of the present disclosure can cool the exhaust gas, and discharge it at an appropriate time for the plants to use, thus improving the yield efficiency of the plants.

Beneficial Effects of the Embodiments

One beneficial effect of the present disclosure is as follows: in addition to adjustment of the electricity of the power grid, the energy storage and release apparatus Z and the method for energy storage and release provided by the present disclosure use the technical solutions of connecting a first heat exchange unit 2 between a first compression unit 1 and a gas storage unit 3; passing a first gas A1 sequentially through the first compression unit 1, the first heat exchange unit 2, the gas storage unit 3, and a turbine unit 6; and then discharging the first gas from an outlet M. As such, a first temperature of the first gas A1 before entering the first heat exchange unit 2 is higher than a second temperature of the first gas A1 after passing through the first heat exchange unit 2, and thereby a first heat energy is provided by a temperature difference between the first temperature and the second temperature of the first gas A1. Thus, excessive heat energy is removed, such that carbon-dioxide-rich gas can be cooled and can be used by plants at appropriate time, increasing the rate of absorbing the carbon dioxide by the plants, and improving the growth rate and yield efficiency of the plants.

The foregoing description of the exemplary embodiments of the disclosure has been presented solely for the purpose of illustration and description. It is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments with modifications suited to the particular use. Alternative embodiments will become apparent to those skilled in the art to which the present disclosure pertains without departing from its principle and scope.

What is claimed is:

1. An energy storage and release apparatus, comprising:
a first compression unit;
a first heat exchange unit;
a gas storage unit, the first heat exchange unit being directly or indirectly connected between the first compression unit and the gas storage unit;
a second heat exchange unit connected between the first heat exchange unit and the gas storage unit; and
a turbine unit, connected between the first heat exchange unit and an outlet, wherein a first gas enters the first compression unit via a first inlet; sequentially passes through the first compression unit, the first heat exchange unit, the second heat exchange unit, the gas storage unit, the second heat exchange unit, and the turbine unit; and then is discharged from the outlet;

wherein a first temperature of the first gas before entering the first heat exchange unit is higher than a second temperature of the first gas after passing through the first heat exchange unit, and a first heat energy is provided by a temperature difference between the first temperature and the second temperature of the first gas; and wherein the first gas unceasingly enters the apparatus via the first inlet within a period of time, such that the first gas delivered from the second heat exchange unit to the turbine unit and the first gas released from the first heat exchange unit mix between the second heat exchange unit and the turbine unit.

2. The energy storage and release apparatus of claim 1, further comprising:
a power generation unit connected to the turbine unit.

3. The energy storage and release apparatus of claim 1, wherein the second temperature of the first gas after flowing out of the first heat exchange unit and before entering the second heat exchange unit is higher than a third temperature of the first gas after passing through the second heat exchange unit, and a second heat energy is provided by a temperature difference between the second temperature and the third temperature of the first gas; and wherein a fourth temperature of the first gas after flowing out of the gas storage unit and before entering the second heat exchange unit is lower than a fifth temperature of the first gas after passing through the second heat exchange unit, and there is a temperature difference between the fourth temperature and the fifth temperature.

4. The energy storage and release apparatus of claim 1, further comprising: a thermoelectric element, connected between the first heat exchange unit and the second heat exchange unit, or connected to at least one of the first heat exchange unit and the second heat exchange unit.

5. The energy storage and release apparatus of claim 1, further comprising: a second compression unit and a third heat exchange unit, wherein the third heat exchange unit is connected between the second compression unit and the gas storage unit; a second gas enters the second compression unit via a second inlet; is sequentially processed by the second compression unit and the third heat exchange unit; and then enters the gas storage unit, so as to store energy, or replace the first gas stored in the gas storage unit, or simultaneously store/release energy and replace the first gas stored in the gas storage unit.

6. The energy storage and release apparatus of claim 5, further comprising: a thermoelectric element, connected to the third heat exchange unit, or connected between the second heat exchange unit and the third heat exchange unit.

7. The energy storage and release apparatus of claim 5, wherein the first heat exchange unit is directly or indirectly connected to the third heat exchange unit; and the first gas sequentially passes through the first compression unit, the first heat exchange unit, and the third heat exchange unit, and enters the gas storage unit, so as to store energy, or replace the second gas stored in the gas storage unit, or simultaneously store/release energy and replace the second gas stored in the gas storage unit.

8. The energy storage and release apparatus of claim 5, wherein the first heat exchange unit is directly or indirectly connected to the gas storage unit; and the first gas sequentially passes through the first compression unit and the first heat exchange unit, and enters the gas storage unit, so as to store energy, or replace the second gas stored in the gas storage unit, or simultaneously store/release energy and replace the second gas stored in the gas storage unit.

9. The energy storage and release apparatus of claim 1, further comprising: a gas mixing unit disposed on at least one of the first inlet and the outlet.

10. The energy storage and release apparatus of claim 1, wherein the first gas is a carbon-dioxide-rich gas.

11. The energy storage and release apparatus of claim 1, wherein the outlet is connected to a plant cultivation device, such that the first gas enters the plant cultivation device via the outlet.

12. A method for energy storage and release, comprising:
passing a first gas through a first compression unit via an inlet to compress the first gas;
passing the first gas through a first heat exchange unit, wherein a first temperature of the first gas before entering the first heat exchange unit is higher than a second temperature of the first gas after passing through the first heat exchange unit, and a first heat energy is provided by a temperature difference between the first temperature and the second temperature of the first gas;
passing the first gas through a second heat exchange unit;
storing the first gas in a gas storage unit; and
releasing the first gas from the gas storage unit, such that the first gas passes through the second heat exchange unit, a turbine unit and then is discharged from an outlet, wherein the first gas drives the turbine unit while passing through the turbine unit;
wherein the first gas unceasingly enters the first compression unit via the inlet within a period of time, such that the first gas delivered from the second heat exchange unit to the turbine unit and the first gas released from the first heat exchange unit mix between the second heat exchange unit and the turbine unit.

13. The method for energy storage and release of claim 12,
wherein the second temperature of the first gas after flowing out of the first heat exchange unit and before entering the second heat exchange unit is higher than a third temperature of the first gas after passing through the second heat exchange unit, and a second heat energy is provided by a temperature difference between the second temperature and the third temperature of the first gas; and
wherein a fourth temperature of the first gas after flowing out of the gas storage unit and before entering the second heat exchange unit is lower than a fifth temperature of the first gas after passing through the second heat exchange unit, and there is a temperature difference between the fourth temperature and the fifth temperature.

14. The method for energy storage and release of claim 13, further comprising:
passing a second gas through a second compression unit to compress the second gas;
passing the second gas through a third heat exchange unit; and
delivering the second gas into the gas storage unit, so as to store energy, or replace the first gas stored in the gas storage unit, or simultaneously store/release energy and replace the first gas stored in the gas storage unit.

15. The method for energy storage and release of claim 14, further comprising:
   passing the first gas through the first compression unit to compress the first gas;
   passing the first gas through the first heat exchange unit;
   passing the first gas through the third heat exchange unit; and
   delivering the first gas into the gas storage unit, so as to store energy, or replace the second gas stored in the gas storage unit, or simultaneously store/release energy and replace the second gas stored in the gas storage unit.

16. The method for energy storage and release of claim 14, further comprising:
   passing the first gas through the first compression unit to compress the first gas;
   passing the first gas through the first heat exchange unit; and
   delivering the first gas into the gas storage unit, so as to store energy, or replace the second gas stored in the gas storage unit, or simultaneously store/release energy and replace the second gas stored in the gas storage unit.

17. The method for energy storage and release of claim 12, wherein before the step of passing the first gas through the first compression unit to compress the first gas, or after the step of passing the first gas through the turbine unit, the method further comprises:
   using a gas mixing unit disposed on either or both of the inlet and the outlet to adjust the composition of the first gas.

18. The method for energy storage and release of claim 12, wherein the first gas is a carbon-dioxide-rich gas.

* * * * *